United States Patent [19]

Clausen

[11] Patent Number: 4,969,656
[45] Date of Patent: Nov. 13, 1990

[54] MULTI-PLACE STROLLER

[76] Inventor: Kenneth A. Clausen, 2165 Baldwin, Jenison, Mich. 49428

[21] Appl. No.: 423,955

[22] Filed: Oct. 18, 1989

[51] Int. Cl.$^5$ .......................... B62B 7/04; B60D 1/145
[52] U.S. Cl. ................................ 280/47.38; 280/79.2; 280/87.01; 280/410; 280/658; 297/226; D12/129
[58] Field of Search ................. 280/47.35, 47.38, 79.2, 280/87.01, 638, 657, 658, 410; 297/226; D12/129; D21/71

[56] References Cited

U.S. PATENT DOCUMENTS

| | | | |
|---|---|---|---|
| D. 145,468 | 8/1946 | Spence | 280/47.38 X |
| D. 153,534 | 4/1949 | Light | D12/129 X |
| D. 160,792 | 11/1950 | La Fever, Jr. | 280/87.01 X |
| D. 200,110 | 1/1965 | Bradley, Jr. | D34/15 |
| D. 218,906 | 10/1970 | Roden | D21/2 |
| 864,222 | 8/1907 | Bates | 280/408 |
| 1,283,591 | 11/1918 | Steendahl | 280/408 |
| 1,662,292 | 3/1928 | Bender | 280/7.1 |
| 1,737,618 | 12/1929 | Siebert | 296/75 |
| 1,815,952 | 7/1931 | Morriss | 280/47.38 |
| 2,347,754 | 5/1944 | Shay | 280/47.38 X |
| 2,415,146 | 2/1947 | Nanna | 280/7.1 |
| 2,435,733 | 2/1948 | Belyeu | 280/30 |
| 2,669,460 | 2/1954 | Wallner | 280/47.38 |
| 2,713,886 | 7/1955 | Solomon | 297/217 |
| 2,884,046 | 4/1959 | Patrick | 280/47.35 X |
| 3,100,120 | 8/1963 | Cleary | 280/87.01 |
| 3,318,612 | 5/1967 | Kuhn | 280/79.2 |
| 3,944,258 | 3/1976 | Christensen | 280/408 |
| 4,482,186 | 11/1984 | Gomes | 297/226 X |
| 4,723,784 | 2/1988 | Muscat | 280/47.38 |
| 4,735,426 | 4/1988 | McConnell | 280/47.38 X |
| 4,805,938 | 2/1989 | Redmond et al. | 280/47.35 |

Primary Examiner—Charles A. Marmor
Assistant Examiner—Brian L. Johnson
Attorney, Agent, or Firm—Waters, Morse, & Harrington

[57] ABSTRACT

This stroller has a series of seats at cut-out areas in a tray supported on columns secured to a wheeled floor panel. A tongue is also secured to the floor panel, the entire assembly being marketable as a kit of a easily assembled components. The seats are slings of fabric, the ends of which traverse slots in the tray. These are secured with dowels engaging loops in the fabric above the tray. The slots are enlarged on the top surface of the tray to retain the dowels against endwise slippage.

3 Claims, 3 Drawing Sheets

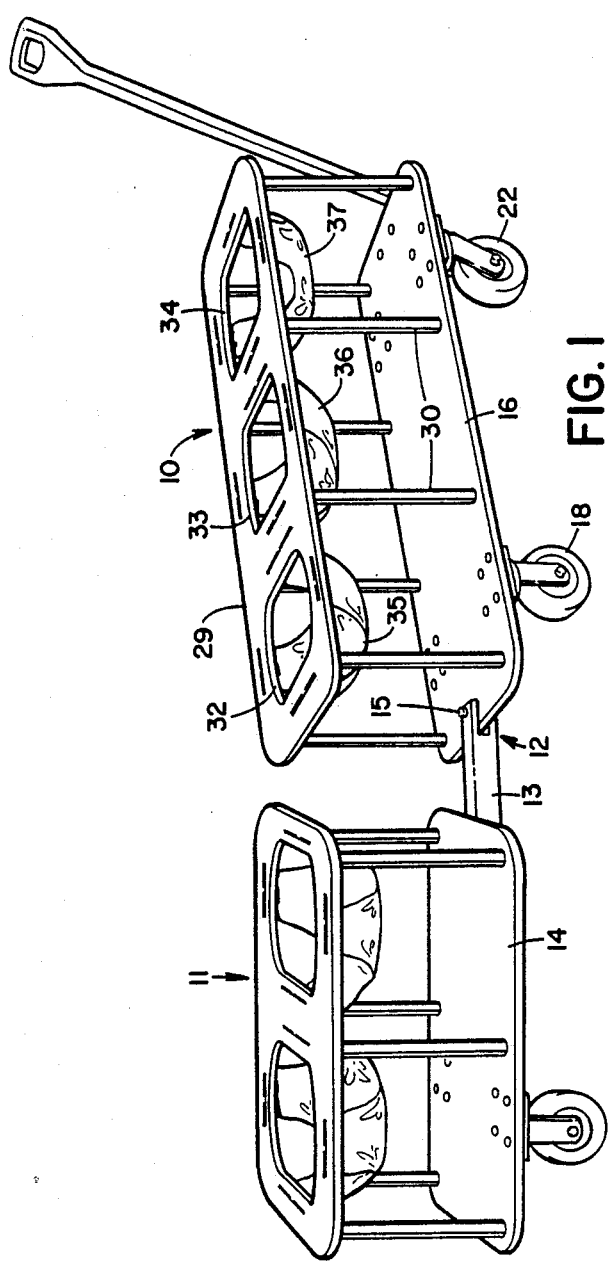
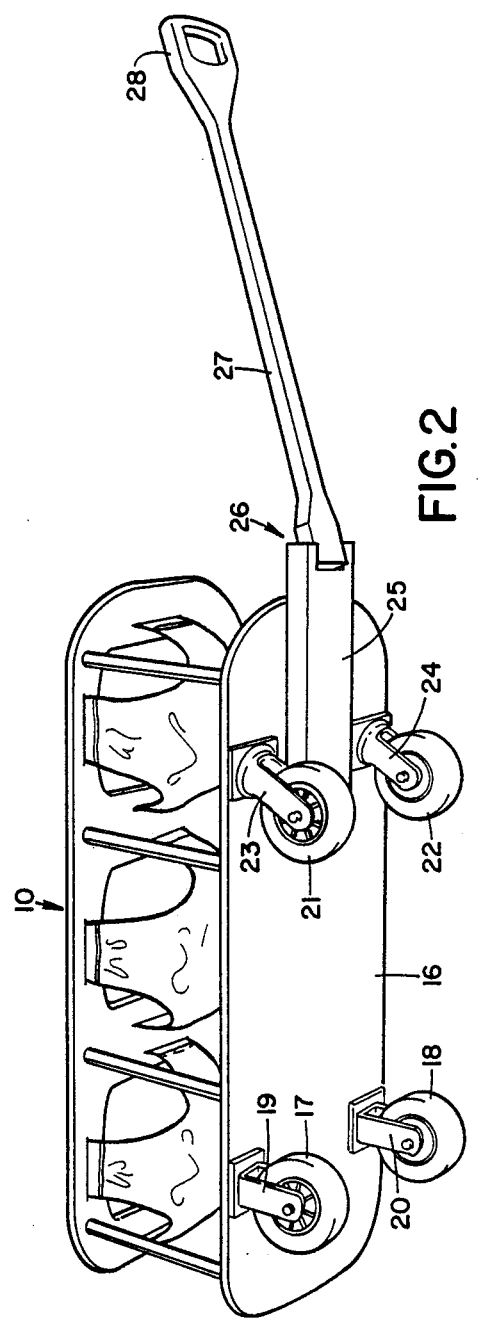
FIG. 1
FIG. 2

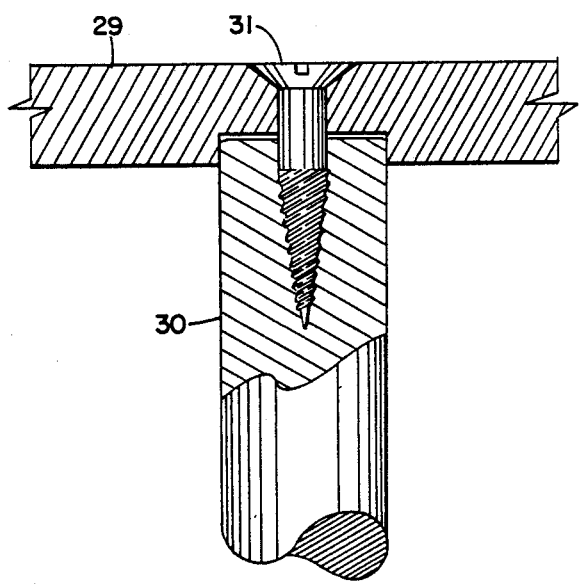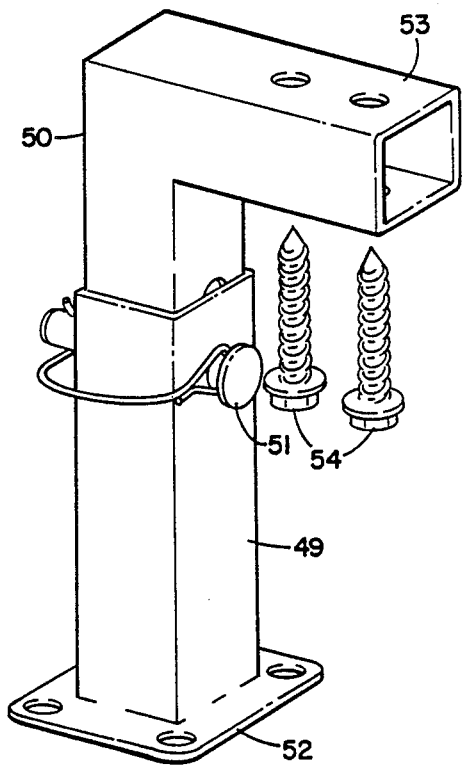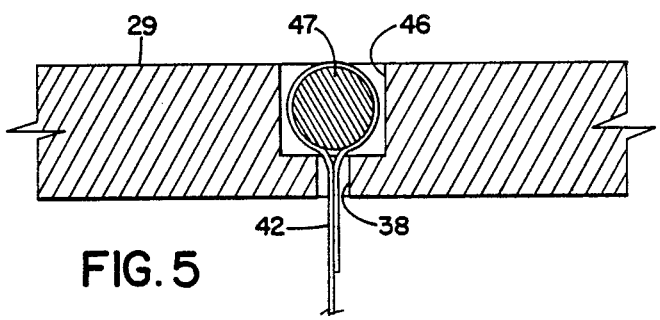

MULTI-PLACE STROLLER

BACKGROUND OF THE INVENTION

Strollers have become standard equipment in every family raising children. The usual ones have a single seat mounted on some sort of structure provided with four small wheels. The front pair of wheels are usually casters, and a jointed tongue extends from the castered end to a handle that permits the stroller to be pulled along behind as a person walks. Pushed versions are also common. These devices can be used from the time the infant can sit up until he can walk well enough on his own to keep up with the adult.

Cost is a significant factor in the purchase of strollers, and this is particularly true when a family may have several "passengers", or where child-care centers may have a group of children to transport at the same time. A separate stroller for each is often prohibitive. Often, the stroller will be broken before it is worn out, complicating the cost problem.

SUMMARY OF THE INVENTION

This invention provides a multi-place stroller capable of accommodating a number of infants, depending on the selected size of the unit. A simplified construction permits marketing the device as a kit of components that can be assembled easily without requiring special skills, or tools beyond a screw driver and possibly a pair of pliers. A floor panel is provided with wheels and a tongue assembly that are screwed or bolted in place in preferably pre-drilled holes. A tray is supported on columns secured to the floor panel, and has seat openings for the children. Fabric slings form seats, and these are received in slots in the tray. Loops in the fabric receive dowels that cannot pass through the slots. The slots are enlarged on top to provide recesses receiving the dowels to prevent endwise movement out of the fabric loops. Provisions are made to couple a second stroller section to function as a trailer to the first one.

DESCRIPTION OF THE DRAWINGS

FIG. 1 is a perspective view showing a three-place stroller towing a two-place "trailer".

FIG. 2 is a perspective view showing the underside of the front unit appearing in FIG. 1.

FIG. 4 is an enlarged section showing the securing of the spacer columns to the tray.

FIG. 5 is an enlarged section showing the retention of the fabric seat slings in the tray panel.

FIG. 6 is a perspective view showing an alternative construction for the spacer columns.

DESCRIPTION OF THE PREFERRED EMBODIMENT

Figure 3:
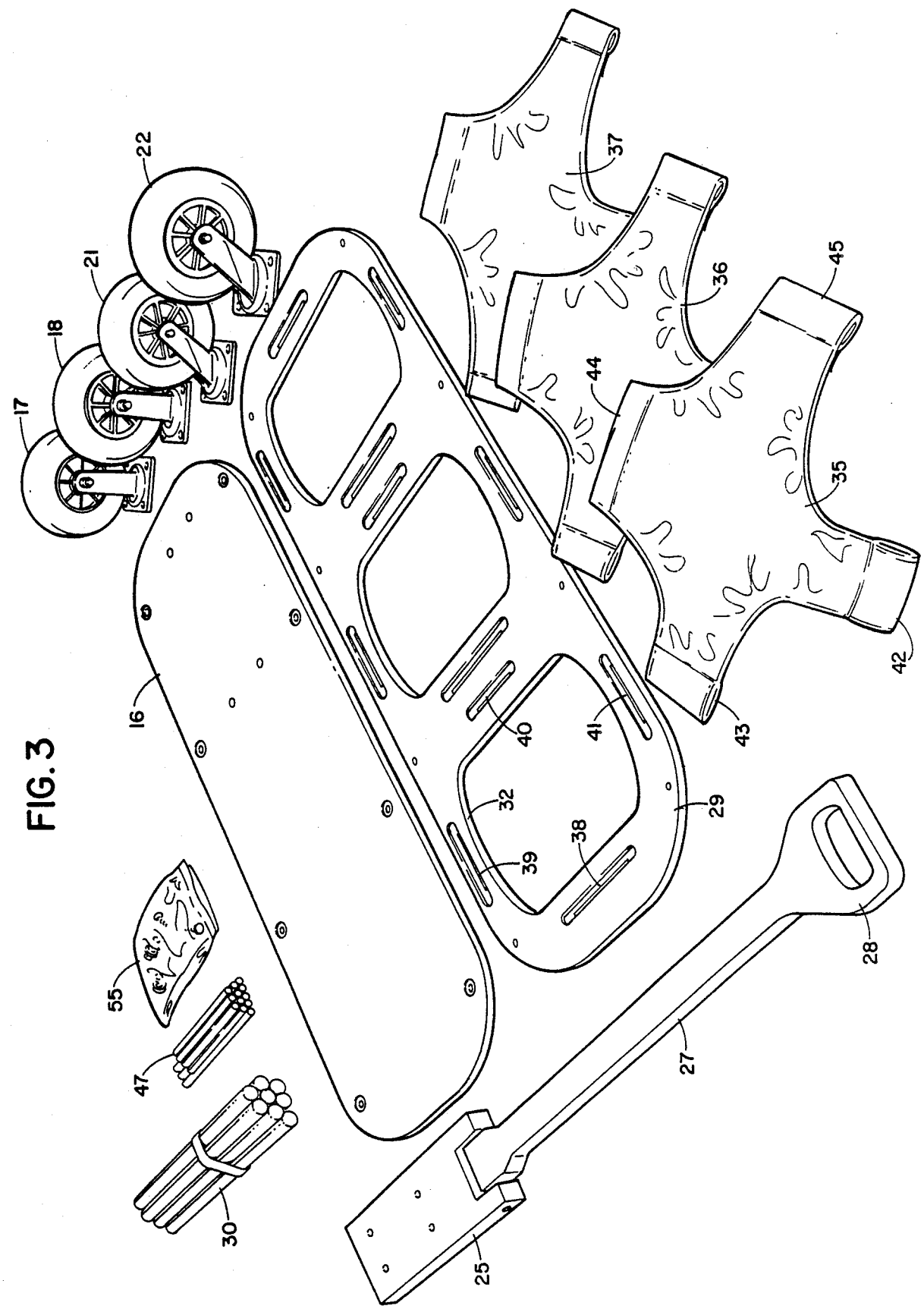
FIG. 3 is an exploded view showing the components of the front stroller unit.

Referring to FIG. 1 of the drawings, the main stroller generally indicated at 10 is shown towing a trailer 11 interconnected with the simple hitch 12. The construction of the trailer is similar to that of the front unit, except for the arrangement of the wheels and the configuration of the tongue. The tongue 13 of the trailer is a simple fixed member bolted to the floor panel 14, and provided with a fork at the forward extremity for receiving the pivot pin 15 traversing the floor panel 16 of the front unit.

Referring to FIG. 2, the rear wheels 17 and 18 are received in brackets 19 and 20, respectively, bolted or screwed to the underside of the floor panel 16. These wheels are coaxial, and have a fixed axis of rotation. The front wheels 21 and 22 are received in castering brackets 23 and 24, respectively, which are also bolted to the underside of the floor panel 16. The fixed member 25 of the tongue assembly is bolted or screwed in place, and is pivotally connected at 26 to the front section of the tongue assembly 27 terminating in the handle 28.

The upper structure of the front vehicle 10 centers in the tray panel 29 supported above the floor panel 16 by a series of columns 30. Referring to FIG. 4, the preferred junction between the columns and the tray panel is shown in an enlarged section. To facilitate the marketing of the device in kit form, it is preferable that the columns be in the form of wooden rods or dowels on the order of an inch in diameter, with the ends pre-drilled to receive screws as shown at 31, which traverse pre-drilled holes in the tray panel, and which are countersunk to provide a flush surface. To reduce any tendency to split the ends of the column, it is preferable to provide the underside of the tray panel 29 with counterbored recesses that tightly receive the column ends. The use of the screws may be supplemented by the application of adhesive at this point, if desired. In any case, this form of junction will withstand a considerable amount of abuse without significant damage.

The tray panel 29 is provided with a series of openings 32–34 to receive the infants. Canvas (or a similar material) slings 35–37 are installed at these openings, and retained as shown in FIG. 5. Each of the cockpit-like cutouts is provided with slots at the front, rear, and both sides, as shown in FIG. 3. Here, the rear cutout 32 has the slots 38–41. The canvas seat slings are all similar, and have loops as shown at 42–45 that traverse these slots as shown in FIG. 5. The slots are enlarged at the upper surface of the tray panel 29, as shown at 46, sufficiently to receive the expansion of the loops caused by the insertion of a small dowel 47, which is large enough to prevent passage through the narrower lower extremity of the slots. The reception of the ends of the dowels 47 down into the recesses 46 prevents any endwise slippage of the dowels out of the loops 42, thus preventing any budding young "engineer" from releasing the front of his own seat, or the rear of that of the passenger in front of him, as a result of innocent experimentation.

FIG. 6 illustrates an alternative form for the columns supporting the tray above the floor panel. The telescoping steel tube sections 49 and 50 have aligned holes at various degrees of extension to receive the cross pin 51. The base flange 52 is welded to the lower section 49, and is provided with holes for receiving bolts or screws traversing the floor panel 16. The upper section 50 of the adjustable column has an offset end 53 provided with holes for receiving screws as shown at 54 adapted to engage the underside of the tray.

Referring to FIG. 2, both of the modifications are readily incorporated in a kit that can be assembled from components that can be packed in a box of very modest dimensions. A package as shown at 55 can contain the various fastenings, and the other components are simply stacked in the most compact configuration that can be worked out. The floor panel and tray are all pr-machined and drilled to receive either screws or bolts, whichever is preferred. Obviously, the seat slings can be placed at whatever configuration may be convenient after the assembly of all of the other components in the package. The floor panel and tray are preferably of plywood, and the tongue assembly is best manufactured from a good grade of lumber.

I claim:

1. A stroller for infants, said stroller being constructed of components comprising:
   a floor panel having an underside;
   wheel means secured to said underside of said floor panel, and including caster means at one end thereof;
   a jointed tongue secured to said floor panel, and extending from said one end;
   a plurality of columns extending upward from said floor panel;
   a tray panel supported on said columns, and having a plurality of openings having opposite ends and opposite sides for confining infants; and
   a plurality of seat means, each seat means including a sling secured to said tray panel at one of said opposite sides and said opposite ends of each of said openings.

2. A stroller as defined in claim 1, wherein each said sling is secured additionally to said tray panel at the other of said opposite sides and said opposite ends of each of said openings.

3. A stroller as defined in claim 1, wherein said columns include telescoping members adapted to provide variable height of said tray above said floor panel.

* * * * *